United States Patent Office 3,495,320
Patented Feb. 17, 1970

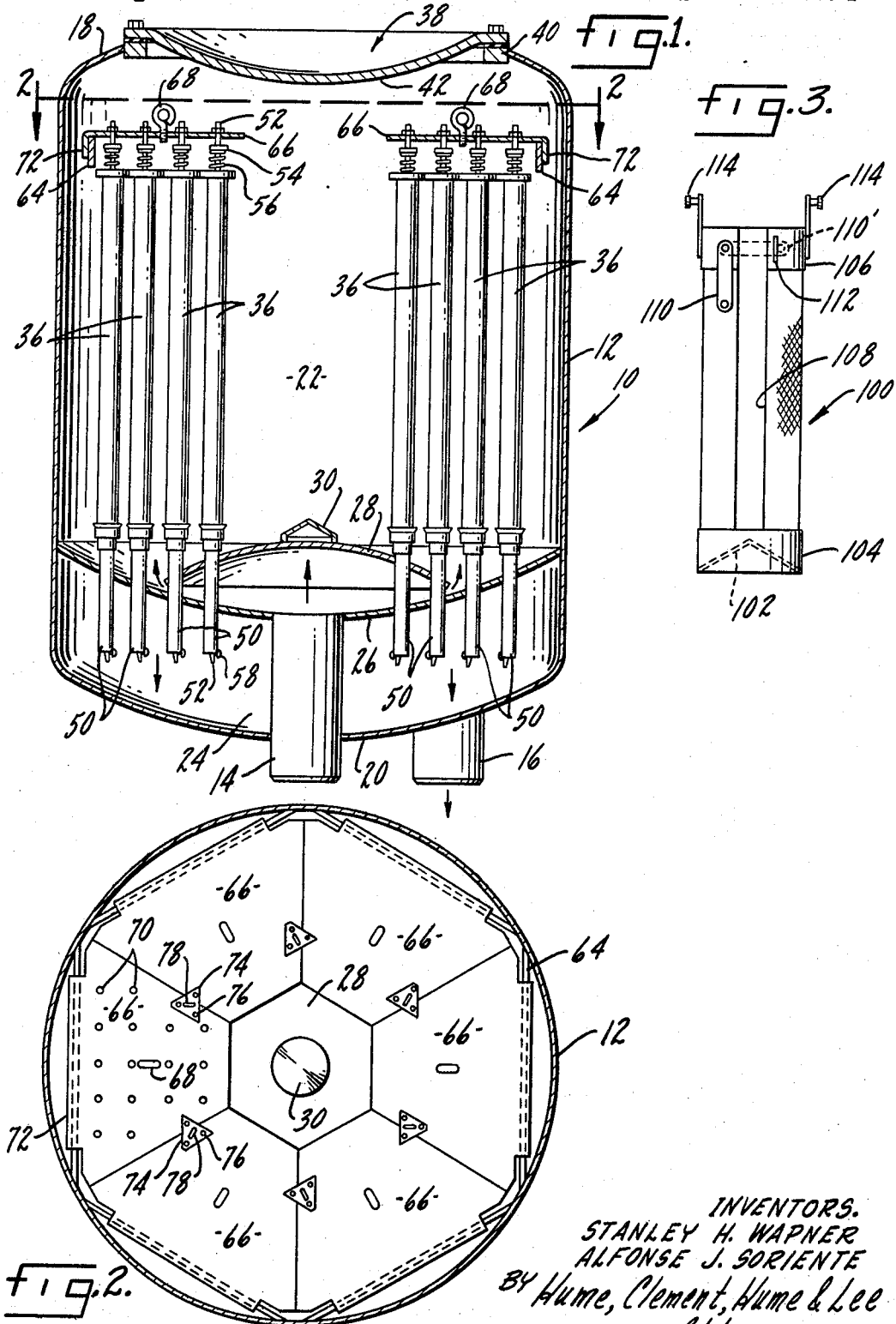

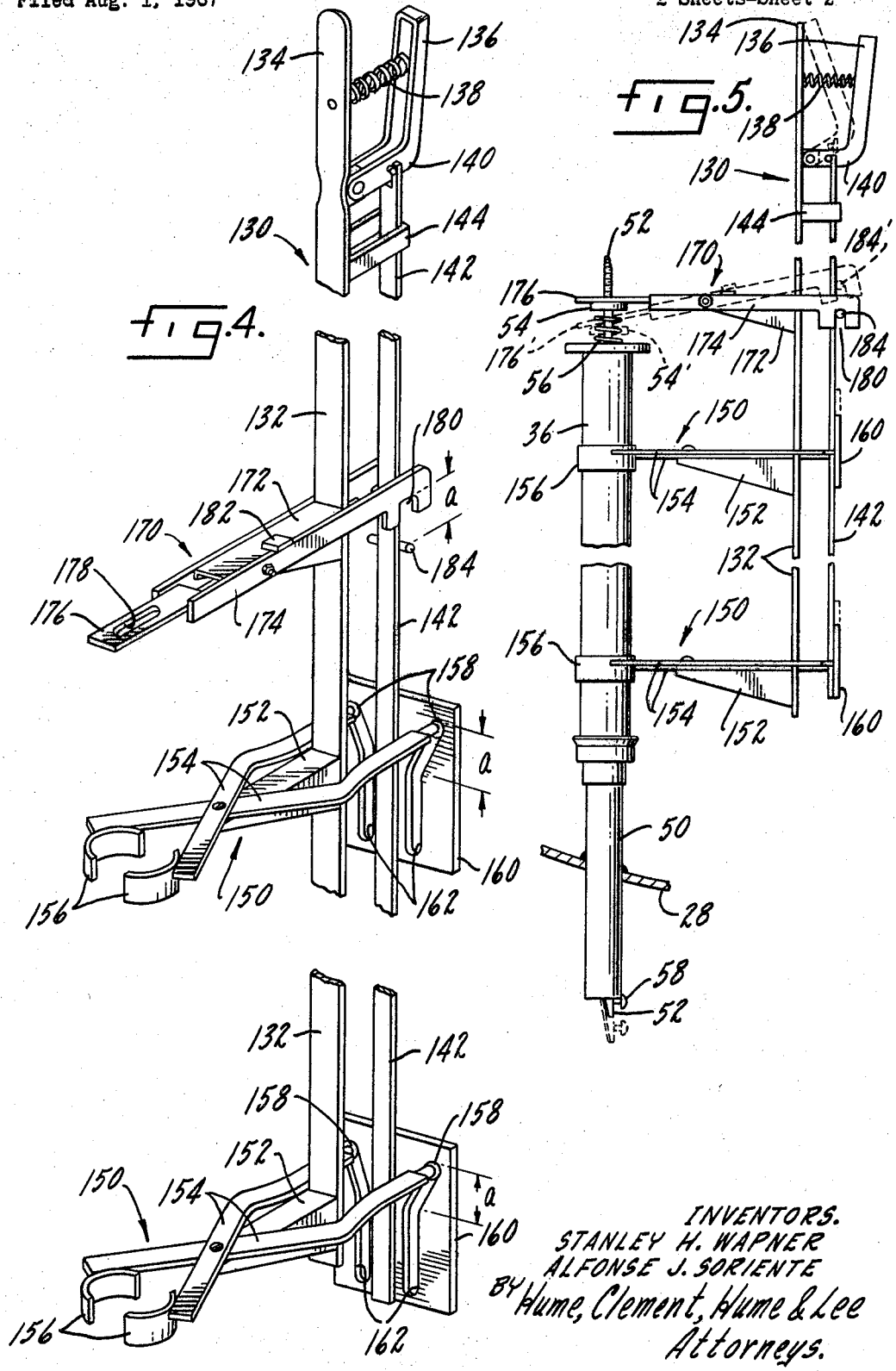

3,495,320
METHOD AND APPARATUS FOR REMOVING CYLINDRICAL FILTER CARTRIDGES
Stanley H. Wapner, New York, N.Y., and Alfonse J. Soriente, Gillette, N.J., assignors, by mesne assignments, to Union Tank Car Company, a corporation of Delaware
Filed Aug. 1, 1967, Ser. No. 657,582
Int. Cl. B23p 19/02
U.S. Cl. 29—427                                11 Claims

ABSTRACT OF THE DISCLOSURE

Cylindrical filter cartridges are removed from a tank by gripping them and compressing the tops to unseat them from seat means within the tank. A plurality of cartridges are then transported to a common container and removed from the tank. The invention further provides apparatus for gripping the cartridges and unseating them by compressing the tops. Apparatus is also provided for collecting a plurality of cartridges and removing them from the tank. The entire operation may be performed from outside the tank, minimizing personnel hazards which may be caused by the presence of dangerous materials.

---

The present invention relates to improvements in the art of handling filters and, more particularly, to a method and apparatus for removing cylindrical filter cartridges and the like from a filter tank.

Filter tanks having replaceable filter cartridges are well known in the art. An exemplary filter tank with filter cartridges is described in Soriente et al., U.S. Patent No. 3,279,608, issued Oct. 18, 1966, and assigned to the assignee of the present application. When the filter cartridges are removed or installed, personnel must reach into or enter the tank in order to handle them. Ordinarily this is not hazardous, but when the apparatus is used to filter substances containing toxic and/or radioactive substances it is dangerous for personnel to enter the tank or be in close proximity to the filter cartridges. In such instances, the operating personnel must have means for removal of the exhausted cartridges from outside the tank.

Accordingly, it is an object of the present invention to provide an improved method and apparatus for handling filters.

It is another object to provide an improved method and apparatus for remotely unseating and transporting cylindrical filter cartridges.

It is still another object to provide an improved apparatus for remotely removing filter elements seated within a tank.

It is a further object to provide an improved apparatus for unseating and transporting filter cartridges from a remote position.

Generally, the present invention provides a new and improved method for removing cylindrical filter cartridges from a tank which includes the steps of simultaneously gripping and unseating the filter cartridges, transporting them to a common container, and removing a plurality of said filter cartridges from the tank while in the container. These steps are performed from outside the tank at a position relatively remote from the cartridges, and in the case of radioactive materials, from behind suitable shielding. The present invention provides apparatus for performing this method including means for gripping the cylindrical cartridges, means for compressing the cartridges to enable the unseating and transporting thereof, and means for collecting and removing a plurality of cartridges from the tank. An important feature of the present invention is the apparatus for remotely unseating and transporting the cartridges, which apparatus includes a shaft having outwardly extending gripping means aligned with outwardly extending compressing means to enable the gripping and unseating of the cylindrical cartridges. The compressing means is disposed above the gripping means, so that the cartridge may be unseated by exerting a downward compression-type action on the top while the lower portion of the cartridge is gripped.

The invention, both as to its organization and method of operation, taken with further objects and advantages thereof, will be understood by reference to the following description, taken in conjunction with the accompanying drawings in which:

FIGURE 1 is a cross-sectional view of a filter tank having removable filter elements mounted therein;

FIGURE 2 is a cross-sectional plan view of the filter tank taken along line 2—2 of FIGURE 1;

FIGURE 3 is a side elevation view of the removal device employed in removing cartridges from the tank;

FIGURE 4 is a perspective view of the unseating and transporting apparatus of the present invention; and FIGURE 5 is a side elevation view of the unseating and transporting apparatus in gripped relation with a cylindrical filter cartridge, showing the unseating of the cartridge from the cartridge seat means.

Referring to the drawings, FIGURE 1 illustrates a filtering device of the type employed in the present invention, generally indicated by reference numeral 10. The device 10 includes a filter tank 12 of generally cylindrical configuration, an inlet line 14 and an outlet or filtrate line 16. The tank 12 has a generally upwardly convex top 18 and downwardly convex bottom 20. The interior of the tank is divided into an influent zone 22 and a filtrate zone 24 by a downwardly convex tube sheet 26 secured to the interior of the tank 12 by welding or the like. The inlet line 14 extends through the bottom 20 of the tank 12 and communicates with the influent zone 22 so that all the influent stream is passed directly to the influent zone 22. The inlet line 14 is attached to the tube sheet plate 26 by welding or the like.

The influent stream from the inlet line 14 is dispersed as it enters the influent zone 22 by a distributor plate 28 having an upwardly convex configuration. The distributor plate 28 is mounted within the influent zone 22 in alignment with the inlet pipe 14 by means not shown in the drawings. As the influent stream enters the influent zone 22 it strikes the distributor plate 28 and is distributed radially outwardly of the distributor plate 28. As shown in FIGURE 1, the distributor plate 28 includes a conical baffle 30 secured to the top thereof and located centrally thereon. This baffle 30 prevents "dead spots" or quiescent areas in the liquid near the center of the distributor plate. Such a quiescent area is especially prevalent when large filter tanks are employed, and permits particulate material to collect on top of the distributor plate 28. The conical baffle 30 creates a downward, outward flow of liquid near the center of the distributor plate 28, keeping material from collecting at that point.

Mounted within the influent zone 22 are a plurality of cylindrical filter cartridges 36 through which the influent stream passes before entering the filtrate zone 24 and being discharged from the tank 12 through the outlet line 16. The filter cartridges 36 are inserted into and removed from the tank 12 through a manhole opening 38 defined by a heavy flange 40 in the top 18 of the tank 12. The manhole opening 38 has a removable cover 42 bolted to the flange 40.

As shown in FIGURE 1, the tube sheet plate 26 has attached thereto cartridge seat means 50, which comprises a plurality of small pipes extending through holes in the tube sheet plate 26 and attached to the plate 26 by welding or the like. The cartridge seat means 50 provides a base for the filter cartridge 36. The cartridge 36 is held in place by a central rod 52 having a screw cap 54 at the top and a spring 56 between the screw cap 54 and the cartridge 36. The spring 56 thus biases the central rod 52 in an upward direction. The bottom of the rod 52 extends beyond the bottom of the cartridge 36, and has a bolt 58 projecting outwardly from the side thereof near the bottom end. When the cartridge 36 is seated in the tank 12, the bolt 58 hooks under the lower edge of the cartridge seat means 50, and is held in place by the upward bias of the rod 52 created by the spring 56.

Near the top of the filter tank 12 is a generally hexagonal retaining ring 64 suitably secured to the interior of the tank 12 at the vertices thereof. Mounted on top of the cartridges 36 are a series of generally trapezoidal locating plates 66, each having an eye means 68 extending upwardly from the top thereof. The arrangement of the trapezoidal plates 66 is best appreciated by reference to FIGURE 2 along with FIGURE 1. Each of the locating plates 66 has a series of openings 70, each of which receives the top of a rod 52. Each of the plates 66 has at its outer edge a bent lip 72 which fits over a leg of the retaining ring 64. As shown in FIGURE 2, six of the locating plates 66 fit together to form a generally hexagonal configuration. The locating plates 66 are held together and in place by triangular link plates 74 secured to the top of the locating plates 66 by bolts 76. Each of the link plates 74 has an eye means 78 extending upwardly from the top.

As shown in FIGURE 3, the present invention includes a removal container for removing a plurality of cartridges 36 from the tank 12 and indicated generally by reference numeral 100. The container 100 is of generally cylindrical shape, is open at the top, and has a conical bottom 102 having its vertex pointing toward the top of the container 100. Around the periphery of the bottom 102 is a reinforcing ring 104. A similar reinforcing ring 106 is located around the top of the container 100. As shown in FIGURE 3, the container 100 includes a relatively narrow vertical slot 108 running from the top edge to a point near the bottom edge. The slot 108 is wide enough to receive a filter cartridge 36. Secured to the upper reinforcing ring 106 is a hasp 110 movable to engage a latch 112 as indicated in the drawings by phantom lines at 110' to prevent filter cartridges 36 from falling out of the container 100. A pair of lifting lugs 114 are attached to opposite sides of the top reinforcing ring 106 to provide means for handling the removal container 100.

Referring to FIGURES 4 and 5, and most particularly to FIGURE 4, the present invention includes a cartridge unseating and transporting apparatus indicated generally by reference numeral 130, for unseating and transporting filter cartridges 36. The unseating and transporting apparatus 130 includes a shaft 132 having a handle 134 at the top end. Adjacent to the handle 134 and hinged at the base thereof is a grip lever 136 normally biased away from the handle 134 by a spring 138 mounted between the handle 134 and the grip lever 136. The bottom of the grip lever 136 terminates in an L-shaped member 140. Parallel to the shaft 132 is a control rod 142 mounted in guides 44 for movement parallel to the shaft 132. The top end of the control rod 142 is hinged to the projecting end of the L-shaped member 140 so that movement of the grip lever 136 toward the handle 134 causes upward movement of the control rod 142. Just below the center of the shaft 132 and near the bottom thereof are a pair of identical gripping assemblies, indicated generally by reference numeral 150, for gripping a filter cartridge 36. Each gripping assembly 150 includes a bracket 152 fixedly mounted on and projecting outwardly from the shaft 132. A pair of scissor-type gripping members 154 is hinged together and mounted on top of the bracket 152 at the point where the members 154 cross. The gripping members 154 will therefore move in a scissor action in a plate approximately perpendicular to the shaft 132. Mounted on the front end of the gripping members 154 are a pair of jaws 156 of arcuate shape to accommodate a cylindrical filter cartridge 36. The rear of the gripping members 154 extends to a point just behind the control rod 142, and includes a suitable cam-following means such as a ball bearing 158.

Fixedly mounted on the back of the control rod 142 are a pair of slotted cam plates 160 having congruent slots 162. The slots 162 have a lower portion parallel to the control rod 142 and an upper portion which angles outwardly from the control rod 142. As shown in FIGURE 4, both the upper and lower portions of the slots 162 are straight. Optionally, the upper portions may be curved, so long as they lead upwardly away from the control rod 142. The precise shape of the upper portion depends on the type of gripping action desired, as will be understood by one with ordinary skill in the art. The cam plates 160 are positioned to engage the ball bearings 158 at the rear of the gripping members 154. When the control rod 142 is at its fully downward position, the bearings 158 are at the upper end of the upper portion of the slots 162, and the jaws 156 are therefore fully open, as shown in FIGURE 4.

Mounted on the shaft 132 above the gripping assemblies 150 is a compressing assembly, indicated generally by reference numeral 170, for compressing the springs 56 on the filters 36. The compressing assembly is mounted a sufficient distance from the handle 134 on the end of the shaft 132 to permit the handling of filter cartridges 36 in the tank 12 from a position outside of the tank. The compressing assembly 170 includes a bracket 172 mounted on the shaft 132, extending outwardly therefrom in alignment with the gripping assemblies 150. Mounted on the bracket 172 is an H-shaped tongue frame 174, mounted for rotation in a vertical plane about the crossbar of the H. At the front of the tongue frame 174 is a slotted compressing tongue 176 fixedly supported between the parallel members of the H-shaped tongue frame 174. The compressing tongue 176 includes a central slot 178 extending outwardly from the shaft 132 and located over the gripping jaws 156 when the tongue 176 is approximately perpendicular to the shaft 132.

The rear of the H-shaped tongue frame 174 has a pair of downwardly projecting slots 180 just behind and adjacent to the control rod 142. The rear of the H-shaped tongue frame 174 is heavier than the front, including the tongue 176, so that the frame 174 will normally be held by gravity in the position shown in FIGURE 4, and by solid lines in FIGURE 5. The tongue frame 174 is kept from falling downwardly to the rear by tab 182 mounted atop the tongue frame 174 and normally contacting the top of the bracket 172, as shown in FIGURE 4.

Mounted on the rear of the control rod 142 is a horizontal bar 184 positioned to penetrate the downwardly projecting slots 180 when the control rod 142 is moved in an upward direction. The distance between the bar 184 and the slots 180 is equal to the vertical distance between the top of the cam slots 162 and the beginning of the lower portions thereof. This distance is represented in FIGURE 4 by the letter *a*. It is thus seen that the horizontal bar 184 will penetrate the slots 180 when the ball bearings 158 on the gripping members 154 have reached the juncture of the upper and lower portions of the cam slots 162. Since the gripping jaws 156 are fully closed at this time, alternate movement of the gripping assemblies 150 and the compressing assembly 170 is produced.

The operation of the unseating and transporting apparatus 130 is best appreciated by reference to FIGURE 5, showing the compress-assembly 170 in normal and moved positions. An operator lowers the apparatus 130 into the tank 12 through the manhole opening 38 and aligns the apparatus with a filter cartridge 36 so that the gripping jaws 156 are adjacent to the side of a cylindrical filter cartridge 36 and the slotted compressing tongue 176 is over the screw cap 54. The grip lever 136 is moved toward the handle 134, causing the control rod 142 to rise relative to the shaft 132. The rising of the control rod 142 also causes the rising of the slotted cam plates 160, thereby camming the ball bearings 158 toward one another, causing the jaws 156 to close and grip the filter cartridge 36. Further movement of the grip lever 136 toward the handle 134 causes the horizontal bar 184 to engage the downwardly projecting slots 180, thereby producing downward movement of the sloted compressing tongue 176 to a downward position 176' shown by phantom limes in FIGURE 5. Such downward movement compresses the spring 56, moving the central rod 52 of the filter element 36 in a downward direction, disengaging the bolt 58 from the cartridge seat means 50 as shown in FIGURE 5. The slot 178 in the compressing tongue 176 accommodates the top of the central rod 52 in the filter cartridge 36, and permits linear movement of the rod 52 in the slot 178, compensating for the arcuate travel of the tongue 176. The filter cartridge 36 is then tilted slightly so that the bolt 58 will not strike the bottom of the cartridge seat means 50, and the filter cartridge 36 is withdrawn from the seat means 50. By matintaining the grip lever 136 in a position close to the handle 134, a grip is maintained on the cartridge 36, and it may be transported to another location.

In carrying out the general removal of filter cartridges 36 from a filtering device 10, the following steps are followed. First, the cover 42 over the manhole opening 38 on top of the tank 12 is unbolted and removed. The bolts 76 in the triangular link plates 74 are then removed with a socket wrench (not shown) having a long extension so that entry into the tank 12 is unnecessary. The triangular link plates 74 are next removed by hooking the eye means 78 with a hook (not shown) having a long extension. The trapezoidal locating plates 66 are similarly removed by hooking the eye means 68 and lifting the plates 66 out of the tank 12. The removal container 100 shown in FIGURE 3 is next lowered into the central portion of the tank 12, and allowed to rest on the conical baffle 30. The cartridge gripping and transporting apparatus 130 is then lowered into the tank 12 and operated to disengage the filter cartridges 36 as hereinbefore described. The cartridges 36 are inserted into the removal container 100 through the vertical slot 108. When the removal container 100 is filled with filter cartridges 36, the hasp 110 is moved into the latch 112 to close the container 100. The filled container is then grasped by the lifting lugs 114, using suitable hooks (not shown), and raised out of the tank 12. The above process is repeated until all of the filter cartridges 36 have been removed from the tank 12.

As is apparent from the above description, the entire operation may be performed without reaching into or in any way entering the tank, thereby minimizing personnel hazards in the presence of toxic or radioactive materials. Furthermore, it will be understood by those skilled in the art that the method and apparatus of the present invention may be used to install filter cartridges 36 in a tank 12 by simply reversing the steps hereinbefore described. Such remote installation is especially useful when residual radioactivity or toxic material remains in the tank after the elements have been removed.

While the embodiments described herein are at present considered to be preferred, it will be understood that various modifications and improvements may be made therein, and it is intended to cover in the appended claims all such modifications and improvements as fall within the true spirit and scope of the invention.

We claim:
1. A method for removing cylindrical filter cartridges from a filter tank, said filter cartridges being vertically supported upon seat means within said tank, and said cartridges having a fastening means extending longitudinally therethrough, said fastening means including engaging means for engaging said seat means and spring-biased means for gripping the end of said cartridge opposite said seat means, said spring-biased means being compressible to release said engaging means, said method comprising: individually gripping each of said cartridges; compressing said spring-biased means while maintaining said grip on said cartridges; unseating and transporting said cartridges to a common container; and removing a plurality of cartridges in said container from said tank.

2. The method of claim 1 wherein said method is performed from a position outside of said filter tank.

3. Apparatus for removing cylindrical filter cartridges from a filter tank, said cartridges being vertically supported upon seat means within said tank, and said cartridges having a fastening means extending longitudinally therethrough, said fastening means including engaging means for engaging said seat means and spring-biased means for gripping the end of said cartridge opposite said seat means, said spring-biased means being compressible to release said engaging means, said apparatus comprising: gripping means for individually gripping said cartridges; compressing means for compressing said spring-biased means while maintaining said grip on said cartridges; and collecting means for collecting and removing a plurality of said cartridges within said tank.

4. The apparatus of claim 3 wherein said collecting means is a cylindrical container having a slot in the side parallel to the axis, said slot sized to receive said cartridges.

5. The apparatus of claim 3 wherein said collecting means further includes means for preventing said cartridges from falling out through said slot.

6. Apparatus for remotely unseating and transporting cylindrical filter cartridges comprising: a shaft having upper and lower ends; gripping means extending perpendicularly from said shaft, said gripping means adapted to grip said cartridges parallel to said shaft; compressing means positioned above said gripping means, said compressing means extending outwardly from said shaft and adapted to compress the end of said cylindrical cartridge gripped by said gripping means; a handle on said upper end of said shaft; control means adjacent to said handle; and actuating means operatively connected to said control means, said gripping means, and said compressing means.

7. The apparatus of claim 6 wherein said gripping means includes two sets of gripping jaws, aligned with one another to grip said cylindrical cartridge parallel to said shaft.

8. The apparatus of claim 7 wherein said compressing means includes a tongue extending outwardly from said shaft over said gripping means in aligned relation therewith, said tongue having a central longitudinal slot extending outwardly from said shaft over said gripping means.

9. The apparatus of claim 6 wherein said control means includes a squeeze-grip lever and a spring normally biasing said lever away from said handle.

10. Apparatus for remotely unseating and transporting cylindrical cartridges comprising: a shaft having upper and lower ends; a handle on said upper end of said shaft; a bracket fixedly mounted on the front of said shaft and extending outwardly therefrom; a first pair of scissor-type gripping members mounted on said bracket for movement in a plane perpendicular to said shaft, said gripping members having first and second ends, said first ends having gripping jaws and said second ends having cam-following means, said cam-following means extending behind said shaft opposite said bracket; a control rod mounted on the rear of said shaft in spaced relation and parallel thereto, said rod being movable parallel to said shaft; a cam plate mounted on said rod, said plate having a pair of congruent slots each having an upper portion angling away from said control rod and a lower portion parallel to said control rod, said slots receiving said cam-following means on said gripping members; compressing means mounted on said shaft above said gripping members, said compressing means operatively connected to said control rod exert a downward force on the top of said cylindrical cartridge gripped by said gripping jaws when said cam-following means moves through said linear portion of said slots; and control means mounted on said shaft adjacent to said handle for moving said control rod parallel to said shaft, whereby to produce alternate movement of said gripping members and said compressing means.

11. The apparatus of claim 10 further including a second pair of scissor-type gripping members mounted on a second bracket perpendicular to said shaft, said second pair of gripping members connected to move in unison with said first pair, and said second pair being aligned with said first pair to grip cylindrical objects parallel to said shaft.

References Cited

UNITED STATES PATENTS 2,239,609  4/1941  Jensen _____ 29—213
3,252,210  5/1966  Bowden _____ 29—280

GERALD A. DOST, Primary Examiner

U.S. Cl. X.R.

29—280